United States Patent Office 2,816,825
Patented Dec. 17, 1957

2,816,825
PLANT PROPAGATING MEDIUM

George W. Schmitz, Scottsdale, Ariz., and Raymond E. Rothfelder, Evanston, Ill., assignors to Zonolite Company, Chicago, Ill., a corporation of Montana No Drawing. Application March 14, 1955,
Serial No. 494,254

3 Claims. (Cl. 71—1)

This invention relates to plant propagation and has for a main object the provision of an improved medium for the propagation of plants from seed, cuttings and the like.

The raising of seedlings of annual flowers, and vegetables, especially to the "transplant" stage, and particularly on a commercial scale involves the control of many factors including nature of the seed bed, temperatures, light conditions, moisture conditions, nutrition requirements and the like, and was, and still is, fraught with difficulties stemming from involuntary, uncontrolled variations in these factors.

In the past and to some extent at the present time, seedlings were and are grown in sand, mixtures of sand and soil, humus, compost, and the like, and more recently in expanded vermiculite and/or mixtures of expanded vermiculite with humus, garden soil and the like. Under most conditions the average flower and vegetable seed such as for example marigolds, pansies, zinnias, scabiosa, cockscomb, petunia, aster, bachelor-button, larkspur, snapdragon, stocks, cabbage, tomato, celery, lettuce, eggplant and onion will do well enough when grown under prior art conditions to produce "transplants" which are saleable, through frequently far from being as strong and hardy as would be desirable.

The present invention is directed to a growth medium which is substantially superior to those used heretofore, and to a technique which requires no "feeding" of the plants from emergence to the transplant stage, and which produces vigorous and hardy transplants which are superior to transplants produced according to methods used heretofore with respect to color, size, hardness of growth, rate of growth, and root development.

One of the great advantages of using expanded vermiculite rather than peat, humus or soil as a growing medium for seeds, cuttings, and the like, is that the material is porous, does not compact readily, holds moisture over extended periods of time, and due to the method used in its manufacture is sterile and free from fungus, molds and the like. It has been found however, that the development of seedlings in vermiculite with the use of feeding solutions, starter solutions, and so on, was too often inadequate to produce transplantable seedlings of good color, size and hardness. While the seedlings could of course be treated with solutions of fertilizer chemicals, such treatments carried with them the disadvantages inherent in controlling the amount of fertilizer used, besides the economic considerations involved, namely added cost arising from the necessity of mixing, measuring and distributing mixtures of fertilizer chemicals with the water.

Attempts in the past to eliminate the use of feeding solutions, starter solutions, etc., by adding fertilizer to vermiculite as a "premix" have resulted in failure because the germination of the seeds was adversely affected by the soluble fertilizer materials.

The present invention is directed to a novel composition which is eminently useful as a growing medium for seedlings and cuttings until they are in the proper state for transplanting.

We have found in this regard, and in accordance with our invention, that we can produce an integral, unitary growing medium having a "built-in" reservoir of plant nutrients which is unexcelled for producing superior seedlings and transplants.

In producing the compositions of this invention, which comprises expanded vermiculite in combination with certain plant nutrients, a number of techniques may be used. Thus soluble fertilizer salts may be put in a water solution and sprayed on to the vermiculite, accompanied by hand mixing. Or insoluble fertilizer salts can be comminuted, say to 100 mesh, and then mixed in a blender after which any soluble fertilizer salts which are to be incorporated my be sprayed on. Or a small amount of soluble fertilizer salts may be ground up with a larger amount of insoluble salt (such as rock phosphorous) and both dry-mixed prior to distribution within the vermiculite. Another variant consists in dividing a batch of vermiculite in two, dry-mixing one portion with insoluble salts, spraying the other portion with soluble salts and then blending the two halves. Or, of course, the soluble salt (usually a very small amount by volume compared to the vermiculite) may be dry-mixed.

It is preferable that the pH of the vermiculite-nutrient additive be in the range of about 6 to 7 for optimum results, although it to be understood that this may be adjusted, as desired, to meet the physiological requirements (insofar as acidity is concerned) of particular plants.

We have discovered that expanded vermiculite in association with certain phosphorous and certain nitrogen-containing products, is a surprisingly outstandingly superior growth medium for seedlings. While the addition of calcium in a form such that it is available to satisfy the plants' requirements is necessary in the case of vermiculite obtained from South Carolina, this is not true of vermiculite coming from Montana mines. We found further that the release of potassium from the vermiculite itself is surprisingly, quite sufficient to meet the nutritional requirements of seedlings, at least up to the transplant stage. Our tests have also indicated that the phosphorous to nitrogen ratio in our compositions should be approximately two to one for best results. We have found in this connection that a combination of high nitrogen and low phosphorous limits or inhibits the rootings of cuttings and also causes seedlings which are too succulent ("soft growth").

In our investigations we used—in combination with the vermiculite component of our growth medium—a number of plant nutrients including some commercial plant foods.

Representative of the compositions investigated are those found in Table 1 below:

TABLE 1

| Chemical | | Nitrogen, Percent | | $P_2O_5$, Percent | | Analysis |
|---|---|---|---|---|---|---|
| Percent (based on vermiculite) | Name | $NH_4$ | $NO_3$ | Soluble | Insoluble | |
| .6 | Ammon. Nitrate | } 1.5 | 6.5 | 0 | 23 | 8-23-40 |
| 2.0 | Rock Phosphate | | | | | |
| .6 | "Take Hold" | } 2.3 | 0 | 12 | 23 | 2.3-35-4 |
| 2.0 | Rock Phosphate | | | | | |
| .6 | "DAP" | } 4.6 | 0 | 12 | 23 | 4.6-35-0 |
| 2.0 | Rock Phosphate | | | | | |
| .6 | Calcium Nitrate | } 0 | 3.1 | 0 | 23 | 3.1-23-0 |
| 2.0 | Rock Phosphate | | | | | |
| .3 | Ammon. Nitrate | } 3 | 12 | 45 | 0 | 15-45-0 |
| .3 | Mon Cal Phos | | | | | |
| .3 | Calcium Nitrate | }10 | 7 | 26 | 0 | 17-26-0 |
| .3 | DAP | | | | | |
| .3 | Potassium Nitrate | }10 | 7 | 26 | 0 | 17-26-0 |
| .3 | DAP | | | | | |
| .6 | Instant Vigoro | | 9.3 | 28 | 0 | 19-28-0 |
| | Urea Nitrogen | 5.5 | 4.2 | | | |
| .6 | Take Hold | 10 | 0 | 52 | 0 | 10-52-17 |
| .6 | DAP | 20 | 0 | 52 | 0 | 20-52-0 |

The above compositions of vermiculite and nutrients were tested to determine their comparative effect on plant growth as represented by (A) three different water solubilities of phosphorous, namely insoluble, fairly soluble, and completely soluble; (B) two different forms of nitrogen ammonia and nitrate, and increasing amounts of each; (C) the effect of soluble calcium and potash at constant nitrogen and phosphorous levels; and (D) combinations of the above factors, that is different solubilities of phosphorous with constant nitrate level and so on.

In these test the seed was sprinkled in rows; the plants were periodically examined and judged after emergence according to the appearance and the amount of the plant of speed of rooting and cutting.

We discovered that neither potassium nor magnesium was a required additive in any of the formulations, and that calcium was supplied in sufficient amounts when using South Carolina vermiculite by the calcium phosphate compounds such as rock phosphate.

The quantity and kind of nitrogen was the single factor which most affected the size or the quantity or the speed of growth and the greenness of color. That is to say that as growth progressed those treatments containing lesser amounts of nitrogen or those cases wherein the nitrogen was supplied only in ammonia form began to show typical nitrogen deficiency symptoms as illustrated by the results shown in Table 2 below.

TABLE 2

| Treatment, Percent Fertilizer | Total Nitrogen, grams/flat | Nitrate Nitrogen, grams/flat | $P_2O_5$, grams/flat |
|---|---|---|---|
| "Best Flats": | | | |
| 2 Rock+.6 $NH_4NO_3$ | .210 | .160 | .700 (insoluble). |
| 2 Rock+.6 $Ca(NO_3)_2$ | .102 | .102 | .700. |
| 2 Rock+.6 $NaNO_3$ | .102 | .102 | .700. |
| .3 Monocalcium Phosphate+.3 $NH_4NO_3$. | .105 | .084 | .270 (all soluble). |
| 2 Rock+.3 $NH_4NO_3$+.3 Take Hold. | .135 | .083 | .970+insoluble, soluble. |
| .3 $Ca(NO_3)_2$+.3 DAP | .102 | .051 | .160 (soluble). |
| "Poor Flats": | | | |
| .3 DAP+.3 $KNO_3$ | .102 | .042 | .160 soluble. |
| .15 $Ca(NO_3)_2$+.15 $KNO_3$+.3 DAP. | .077 | .030 | .160 soluble. |
| 2.0 Rock+.3 Vigoro | .120 | .024 | .730 insoluble, soluble. |
| 2.0 Rock+.3 DAP | .120 | none | .730 insoluble, soluble. |
| "Very Poor": | | | |
| .3 Vigoro+.3 Monocalcium phosphate. | .060 | .012 | .42 soluble. |
| 2.0 Rock+.3 Take Hold | .060 | none | .73 insoluble, soluble. |
| check | none | none | none. |

Where the phosphorous content was low or may have been unavailable it was noted that plant growth was restricted. All of the high nitrate treatments listed in the above table appeared to have a sufficient delivery of phosphorous to the plant, because no phosphorous deficiency symptoms appeared in the six best flats listed above.

A subsequent examination of flats with seven different flower and vegetable transplants gave results as shown in Table 3 below.

TABLE 3

Best flats:

3% rock phosphate+.6% $NH_4NO_3$
4% rock phosphate+.6% $NH_4NO_3$
0.5% super phosphate+.6% $NH_4NO_3$
2.0% rock phosphate+.6% $NH_4NO_3$ Worst flats:

2% monocalcium phosphate+.3% $NH_4NO_3$
2% rock phosphate+.5% $(NH_4)_2SO_4$
.6% Vigoro (added according to directions on package)
.6% DAP (sprayed on after planting)
.6% "Take Hold" (sprayed on after planting)

Based on our tests we have found that expanded vermiculite containing up to about 1.5%, and preferably about 0.4–0.8% of ammonium nitrate in combination with from 2% to 4% of finely ground rock phosphate not only provided adequate nutrient materials to satisfy the physiological requirements of seedlings to the transplant stage but that the resulting transplants were outstanding in color, size, vigor and hardness compared to those grown in accordance with representative commercial procedures. We also discovered surprisingly that nitrogen in ammonia form is not adequate for optimum plant growth when used in combination with expanded vermiculite, and that combinations of rock phosphate and ammonium nitrate consistently provided the best plant growth.

Not only was the rock phosphate-ammonium nitrate composition the most satisfactory insofar as growth and appearance of plants was concerned but it was easiest to mix since the small amount of soluble salt could be mixed with the rock phosphate and this mixture then blended uniformly with the vermiculite.

From the foregoing it is seen that an important characteristic of the composition of the present invention is the fact that adequate nutrients are provided in a form which permits normal unimpeded germination of seeds. A further important characteristic is the fact that water does not leach out of this composition the component nutrients herein. For example, the potassium component, being present as part of the crystal structure of the vermiculite, is completely insoluble. The phosphorous being a constituent of the insoluble rock phosphate is likewise insoluble. And the nitrogen, especially when it is in the form of the ammonium ion, is tightly held by the vermiculite, apparently because of the ion exchange forces of the latter.

It is to be noted that one of the characterizing features of our novel composition is the relative insolubility of the major nutrients therein. This is important because the normal germinating characteristics of seeds are not upset when the present growth medium is used. Or stated in another way, the soluble salts in the present composition are present in such low amount that they do not adversely affect the germination of the seed.

Though these major nutrients appear to be quite inaccessible to the plants, the fact of the matter is that the rootlets of plants can effect forces to extract and obtain needed nutrients, which forces are far in excess of those exerted in situations where nutrients having normal solubility are present. The phenomenal growth resulting from our novel growth medium appears to be due in no small part to the fact that the germinating plant obtains its needed nutrients, selectively, and in proper balance.

Modifications of our invention will suggest themselves to the skilled in the art and accordingly it is to be understood that the present invention is not to be limited in respect to the specific embodiments hereinbefore described, but rather the purview of the invention is to be determined in accordance with the scope of the appended claims.

We claim:

1. A growth medium for the propagation of plants to the transplant stage consisting essentially of a mixture of expanded vermiculite, 2 to 4 percent, by weight of the vermiculite, of a water-insoluble phosphate as the essential phosphate supplying component, and 0.4 to 1.5 percent, by weight of the vermiculite, of ammonium nitrate, as the essential nitrogen-supplying component, all of said ammonium nitrate being combined with the said vermiculite on contact therewith, providing an essentially water insoluble source of nitrogen, said medium being otherwise substantially free of water-soluble salts.

2. A growth medium for the propagation of plants to the transplant stage consisting essentially of a mixture of expanded vermiculite, 2 to 4 percent by weight of the vermiculite, of rock phosphate as the essential phosphate supplying component, and from 0.4 to 0.8 percent, by weight of the vermiculite, of ammonium nitrate as the essential nitrogen-supplying component, all of said ammonium nitrate being combined with the said vermiculite on contact therewith, providing an essentially water insoluble source of nitrogen, said medium being otherwise substantially free of water-soluble salts.

3. A growth medium as set forth in claim 1 the medium having a pH of 6 to 7.

References Cited in the file of this patent

UNITED STATES PATENTS

| | | |
|---|---|---|
| 2,113,523 | White | Apr. 5, 1938 |
| 2,240,859 | Rice | May 6, 1941 |
| 2,341,800 | Martin et al. | Feb. 15, 1944 |
| 2,669,510 | Dresser | Feb. 16, 1954 |